(12) United States Patent
Braam et al.

(10) Patent No.: US 9,157,808 B2
(45) Date of Patent: Oct. 13, 2015

(54) DETECTOR ASSEMBLY

(75) Inventors: Jan A. Braam, Bradenton, FL (US);
Paul Schatz, Bradenton, FL (US)

(73) Assignee: UTC FIRE & SECURITY CORPORATION, Farmington, CT (US)

(*) Notice: Subject to any disclaimer, the term of this patent is extended or adjusted under 35 U.S.C. 154(b) by 400 days.

(21) Appl. No.: 13/820,824

(22) PCT Filed: Sep. 7, 2010

(86) PCT No.: PCT/US2010/047964
§ 371 (c)(1),
(2), (4) Date: Mar. 5, 2013

(87) PCT Pub. No.: WO2012/033482
PCT Pub. Date: Mar. 15, 2012

(65) Prior Publication Data
US 2013/0170521 A1 Jul. 4, 2013

(51) Int. Cl.
| | |
|---|---|
| *G01K 7/00* | (2006.01) |
| *G01K 7/16* | (2006.01) |
| *G08B 17/06* | (2006.01) |
| *G08B 17/10* | (2006.01) |
| *G01K 7/02* | (2006.01) |

(Continued)

(52) U.S. Cl.
CPC .. *G01K 7/16* (2013.01); *G01K 7/00* (2013.01); *G01K 7/02* (2013.01); *G08B 17/06* (2013.01); *G08B 17/10* (2013.01); *G01K 7/22* (2013.01); *G01K 7/223* (2013.01); *G08B 17/00* (2013.01)

(58) Field of Classification Search
CPC ............ G01K 7/00; G01K 7/16; G01K 7/22; G01K 7/223; G08B 17/00; G08B 17/06; G08B 17/10
USPC .................. 374/179, 185, 163; 340/577–578, 340/584–600, 628
See application file for complete search history.

(56) References Cited

U.S. PATENT DOCUMENTS

| | | | |
|---|---|---|---|
| 4,099,152 A | 7/1978 | Nichols | |
| 4,163,963 A * | 8/1979 | Ryckman, Jr. | .................. 338/28 |

(Continued)

FOREIGN PATENT DOCUMENTS

| | | |
|---|---|---|
| CN | 2051519 U | 1/1990 |
| CN | 2535804 Y | 2/2003 |

(Continued)

OTHER PUBLICATIONS

UTC Fire & Security Corporation, International Preliminary Report on Patentability, PCT/US2010/047364, issued Mar. 12, 2013.

(Continued)

*Primary Examiner* — Lisa Caputo
*Assistant Examiner* — Jonathan Dunlap
(74) *Attorney, Agent, or Firm* — Cantor Colburn LLP

(57) ABSTRACT

A detector assembly is provided and includes a board, a temperature response element and a support coupled to the board to support the temperature response element, the support including an elongate member having first and second opposing ends and being coupled to the board at the first end, guides through which temperature response element leads are threadable, and a saddle disposed at the elongate member second end to inhibit displacement of the temperature response element.

18 Claims, 4 Drawing Sheets

(51) Int. Cl.
*G08B 17/00* (2006.01)
*G01K 7/22* (2006.01)

(56) References Cited

U.S. PATENT DOCUMENTS

| | | | |
|---|---|---|---|
| 4,449,035 A * | 5/1984 | Schwob | 219/251 |
| 4,483,631 A * | 11/1984 | Kydd | 374/141 |
| 4,549,433 A * | 10/1985 | Gneiss et al. | 73/204.26 |
| 4,759,895 A * | 7/1988 | Fortune et al. | 374/179 |
| 4,929,093 A * | 5/1990 | Suzuki et al. | 374/208 |
| 5,450,066 A | 9/1995 | Brighenti et al. | |
| 5,584,579 A * | 12/1996 | Asano et al. | 374/208 |
| 6,089,110 A | 7/2000 | Pallotta et al. | |
| 6,154,142 A * | 11/2000 | Kosugi et al. | 340/589 |
| 6,204,768 B1 * | 3/2001 | Kosugi et al. | 340/577 |
| 6,220,749 B1 | 4/2001 | Wyker | |
| 6,377,182 B1 | 4/2002 | Devine et al. | |
| 6,438,335 B1 | 8/2002 | Kinouchi et al. | |
| 6,543,282 B1 * | 4/2003 | Thompson | 73/204.15 |
| 6,552,307 B2 | 4/2003 | Schilling et al. | |
| 6,737,977 B2 * | 5/2004 | Nishikawa et al. | 340/628 |
| 6,917,296 B2 * | 7/2005 | Mayusumi et al. | 340/584 |
| 7,030,766 B2 | 4/2006 | Right et al. | |
| 7,065,407 B2 | 6/2006 | Bardy et al. | |
| 7,075,407 B1 | 7/2006 | Kawamoto et al. | |
| 7,129,847 B2 | 10/2006 | Right et al. | |
| 7,162,150 B1 | 1/2007 | Welch et al. | |
| 7,193,498 B2 | 3/2007 | Kawamoto et al. | |
| 7,469,582 B2 | 12/2008 | Saito et al. | |
| 8,033,718 B2 * | 10/2011 | Nishiyashiki | 374/141 |
| 8,106,784 B2 * | 1/2012 | Katou et al. | 340/628 |
| 8,610,586 B2 * | 12/2013 | Shimada et al. | 340/627 |
| 8,882,346 B2 * | 11/2014 | Bombardieri et al. | 374/141 |
| 2002/0084907 A1 * | 7/2002 | Rattman et al. | 340/630 |
| 2005/0030172 A1 | 2/2005 | Right et al. | |
| 2006/0208848 A1 | 9/2006 | Kawamoto et al. | |
| 2009/0146062 A1 | 6/2009 | Russell | |
| 2009/0243835 A1 | 10/2009 | Katou et al. | |
| 2010/0176912 A1 | 7/2010 | Sears et al. | |
| 2010/0177802 A1 | 7/2010 | Weyna | |

FOREIGN PATENT DOCUMENTS

| | | |
|---|---|---|
| CN | 1750057 A | 3/2006 |
| EP | 1272992 | 9/2003 |
| JP | 63-318702 A | 12/1988 |
| JP | 11-167685 A | 6/1999 |
| JP | 2005-134119 A | 5/2005 |

OTHER PUBLICATIONS

First Chinese Office Action (translation) and Search Report for application CN201080068994.0, dated Oct. 8, 2014, 8 pages.

* cited by examiner

DETECTOR ASSEMBLY

CROSS REFERENCE TO RELATED APPLICATIONS

This application is a non-provisional patent application which claims the benefit of International Application No. PCT/US10/47964 filed Sep. 7, 2010, the entire contents of which are incorporated herein by reference.

BACKGROUND OF THE INVENTION

The subject matter disclosed herein relates to a detector assembly and, more particularly, to a detector assembly having a thermistor support.

In general, most residential and commercial buildings are required by local, state and/or federal regulations to include some type of smoke, heat and/or carbon monoxide detector such that, in an event of a dangerous situation, such as a fire, the inhabitants of the building can be evacuated as quickly as possible. These detectors must be, therefore, relatively inexpensive and nearly failure proof.

Typical detectors include a base that is attached to a wall of a building, a cover plate that is removably attachable to the base and detector components that are provided either within a space defined between the base and the cover plate or partially protrude from the cover plate. Often, the detector components are also removable, replaceable and interchangeable.

Whether the detector components are encompassed by the cover plate or removable, replaceable and interchangeable, some of the detector components are relatively flimsy and can be damaged, deformed or bent during the lifecycle of the detectors. This is particularly true where cover plate removal and reattachment tends to impact the detector components that are flimsier than others and the potential for damage from these impacts can hinder the performance of the detectors and lead to dangerous results.

BRIEF DESCRIPTION OF THE INVENTION

According to one aspect of the invention, a detector assembly is provided and includes a board, a temperature response element and a support coupled to the board to support the temperature response element, the support including an elongate member having first and second opposing ends and being coupled to the board at the first end, guides through which temperature response element leads are threadable, and a saddle disposed at the elongate member second end to inhibit displacement of the temperature response element.

According to another aspect of the invention, a detector assembly is provided and includes a planar board, a thermistor, including a substantially cylindrical part, to measure an ambient temperature and a support coupled to the board to support the thermistor, the support including an elongate member having first and second opposing ends and being coupled to the board at the first end, guides through which thermistor leads are threadable, and a saddle disposed at the elongate member second end and including a distal end surface formed to define a groove to inhibit movement of the substantially cylindrical part in a radial dimension thereof.

According to yet another aspect of the invention, a detector assembly is provided and includes a planar board to which a detector assembly component is removably attachable, a plurality of thermistors, each including a substantially cylindrical part, to measure an ambient temperature and a plurality of supports coupled to the board to respectively support each of the thermistors, the supports each including an elongate member having first and second opposing ends and being coupled to the board at the first end, guides through which thermistor leads are threadable, and a saddle disposed at the elongate member second end and including a distal end surface formed to define a groove to inhibit movement of the corresponding substantially cylindrical part in a radial dimension thereof.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
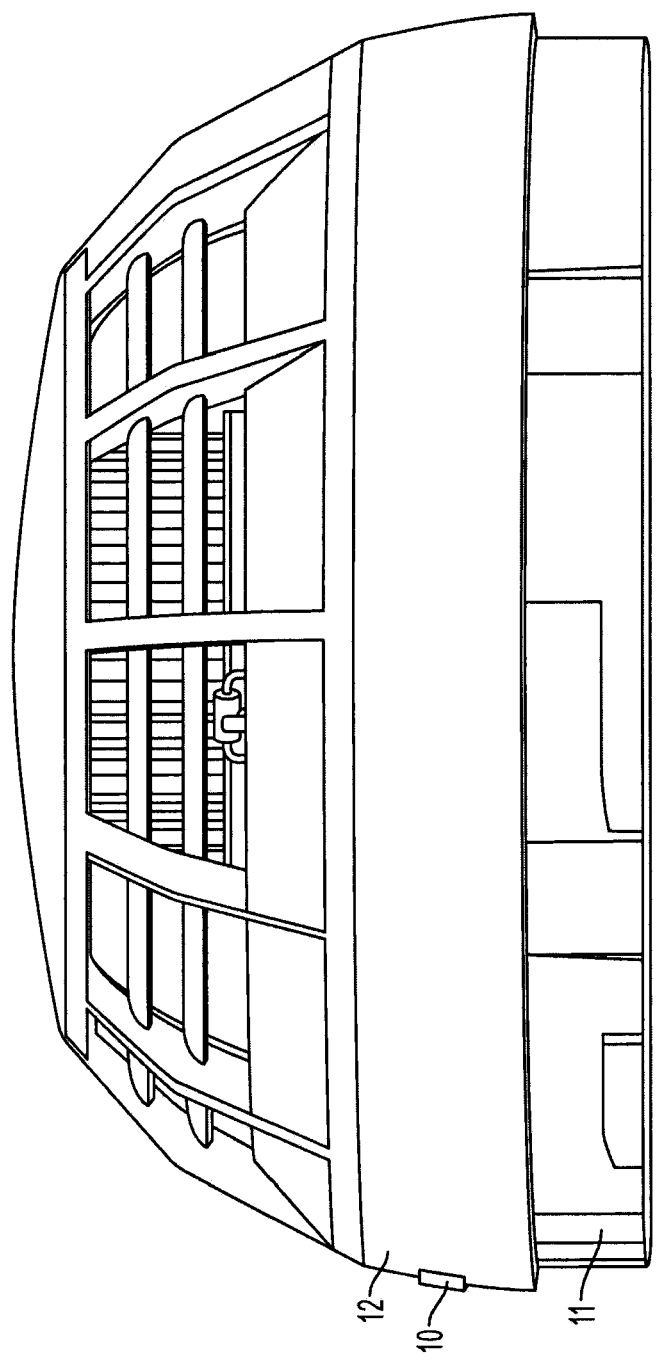
FIG. 1 is a side view of a detector assembly.
Figure 2:
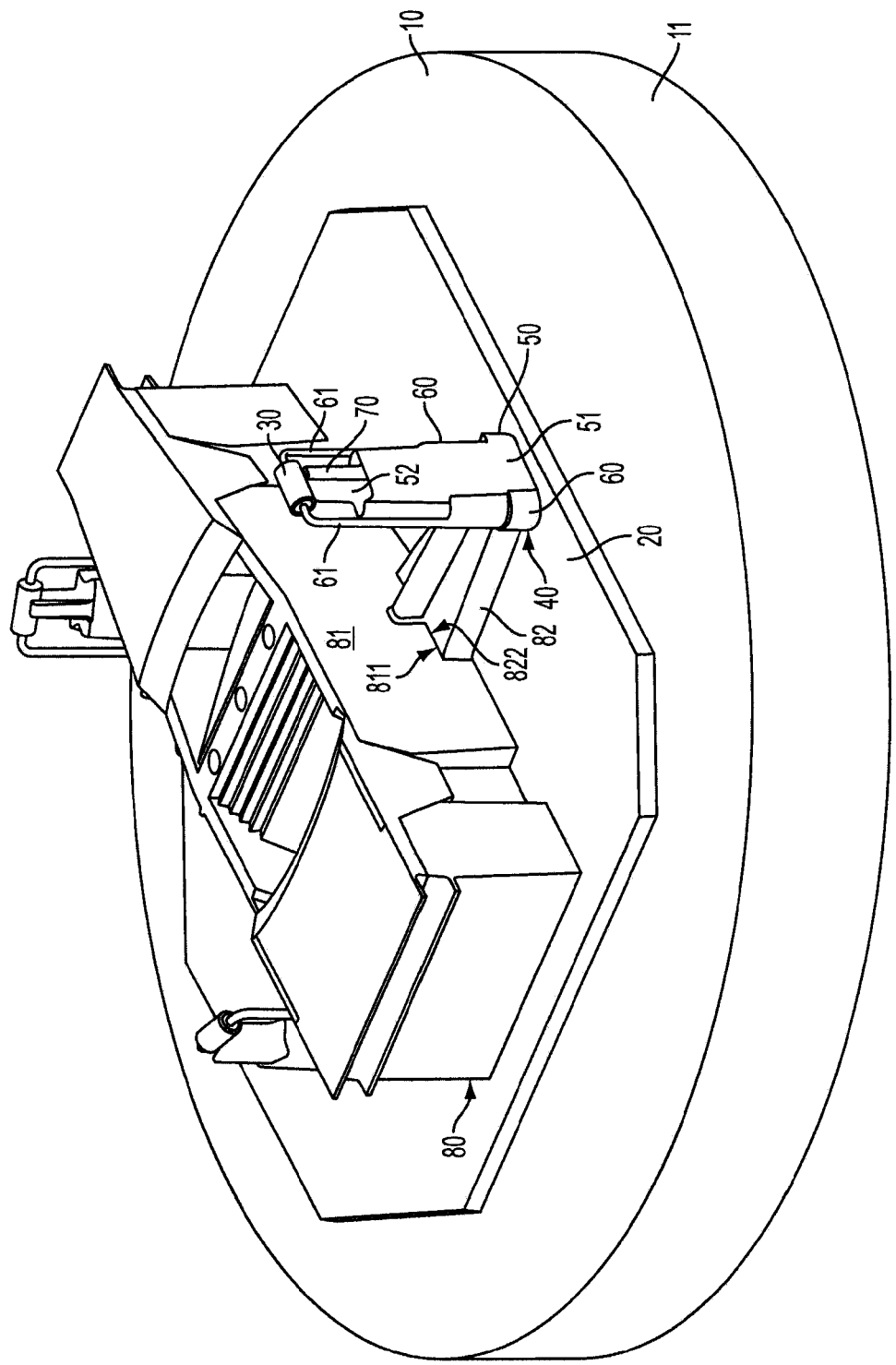
FIG. 2 is a perspective view of an interior of the detector assembly of FIG. 1.

With reference to FIGS. 1 and 2, a detector assembly 10 is provided. The detector assembly 10 can be built for use in at least heat, smoke and/or carbon monoxide (CO) detection in residential and/or commercial buildings and to comply with any applicable local, state and/or federal regulations. As shown, the detector assembly 10 includes a base 11 that is attachable to a wall of a building and a cover plate 12 that is removably attachable to the base 11. The detector assembly 10 further includes a board 20, which is attachable to the base 11, a temperature response element 30 and a support 40.

The support 40 is coupled to the board 20 and configured to support the temperature response element 30 at a location axially displaced from the board 20. To this end, the support 40 includes an elongate member 50, guides 60 and a saddle 70. The elongate member 50 has first and second opposing ends 51, 52 and is tapered from the first end 51 to the second end 52. The first end 51 is coupled to the board 20 such that the second end 52 is distally disposed in an axial direction relative to a plane of the board 20. The guides 60 are generally shorter than and provided aside the elongate member 50. The guides 60 provide for a guidance structure through which leads 61 of the temperature response element 30 are threadable or extendable without presenting unnecessarily long heat transfer surfaces. The saddle 70 is disposed at the second end 52 and is configured to inhibit displacement of the temperature response element 30.

The detector assembly 10 may further include a detector assembly component 80. The detector assembly component 80 may be removably attachable to the board 20 and includes at least one or more of a smoke chamber, a power coupling and a control element. Since the detector assembly component 80 is removably attachable, it is possible that an orientation of the temperature response element 30 and the support 40 is variable relative to that of the detector assembly component 80, which is designed so as to allow for or correct for such an occurrence. In an embodiment, the detector assembly component 80 may include a housing 81 having a contoured sidewall 811. The support 40, in this case, may include a lateral member 82 extending along the board 20 and having a contoured surface 822 that complements the contoured sidewall 811.

The temperature response element 30 may be plural in number and the plurality may be arrayed around the detector assembly component 80 with correspondingly arrayed supports 40 also provided. In particular, three temperature response elements 30 may be provided and arrayed around the detector assembly component 80 with substantially uniform spacing. In this case, the detector assembly 10 can be programmed or designed to account for the individual measurements of each temperature response element 30 in a detection operation or to rely on the combined measurements as a whole. In doing so, the detector assembly 10 can account for the placement of the individual response elements 30 in weighing the measurements of each so as to derive an overall measurement.

Where the detector assembly 10 is provided for use as a heat detector, in particular, the temperature response element 30 may include at least one or more of a diode, a resistive element, a thermocouple and a thermo-electric element. In each of these cases, the saddle 70 and the temperature response element 30 include contactable parts with complementary shapes.

Figure 3:
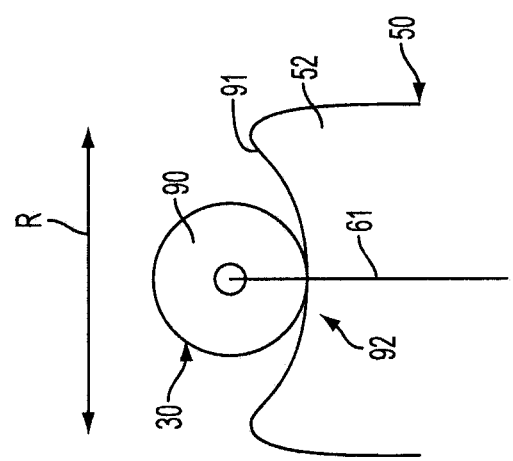
FIG. 3 is an axial view of a temperature response element and a saddle in accordance with embodiments of the invention.

For example, as shown in FIG. 3, the temperature response element 30 may be a diode including a substantially cylindrical part 90 formed of glass or a similar material. In this case, the saddle 70 includes a distal end surface 91 that is formed to define a groove 92 in which the substantially cylindrical part 90 sits. Since the curvature of the groove 92 complements the circumferential curvature of the substantially cylindrical part 90 and the longitudinal flatness of each also complement one another, the groove 92 serves to inhibit movement of the substantially cylindrical part 90 in a radial dimension, R. Thus, an impact on the temperature response element 30 that would otherwise displace the temperature response element 30 in the radial dimension, R, will be absorbed by the contact between the substantially cylindrical part 90 and the distal end surface 91 such that displacement of the temperature response element 30 will be prevented. The saddle 70 may be further provided with bosses to prevent longitudinal movement of the substantially cylindrical part 90. However, since the leads 61 are threaded/extended through the guides 60, the longitudinal movement is generally preventable.

Figure 4:
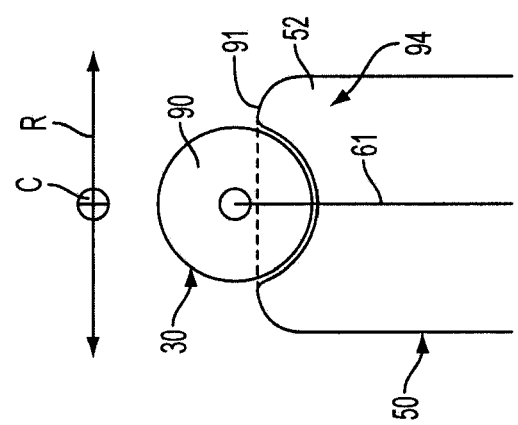
FIG. 4 is an axial view of a temperature response element and a saddle in accordance with further embodiments of the invention.

As a further example, as shown in FIG. 4 and, in accordance with alternate embodiments, the temperature response element 30 may instead include a substantially spherical part. In this case, the distal end surface 91 of the saddle 70 can be formed to define either the groove 92, as described above, or it may be formed to define a depression 94. Where the distal end surface 91 of the saddle 70 is formed to define the depression 94, the temperature response element 30 can sit inside the depression 94 with movement thereof inhibited in multiple dimensions, such as the radial dimension, R, and the circumferential dimension, C.

Figure 5:
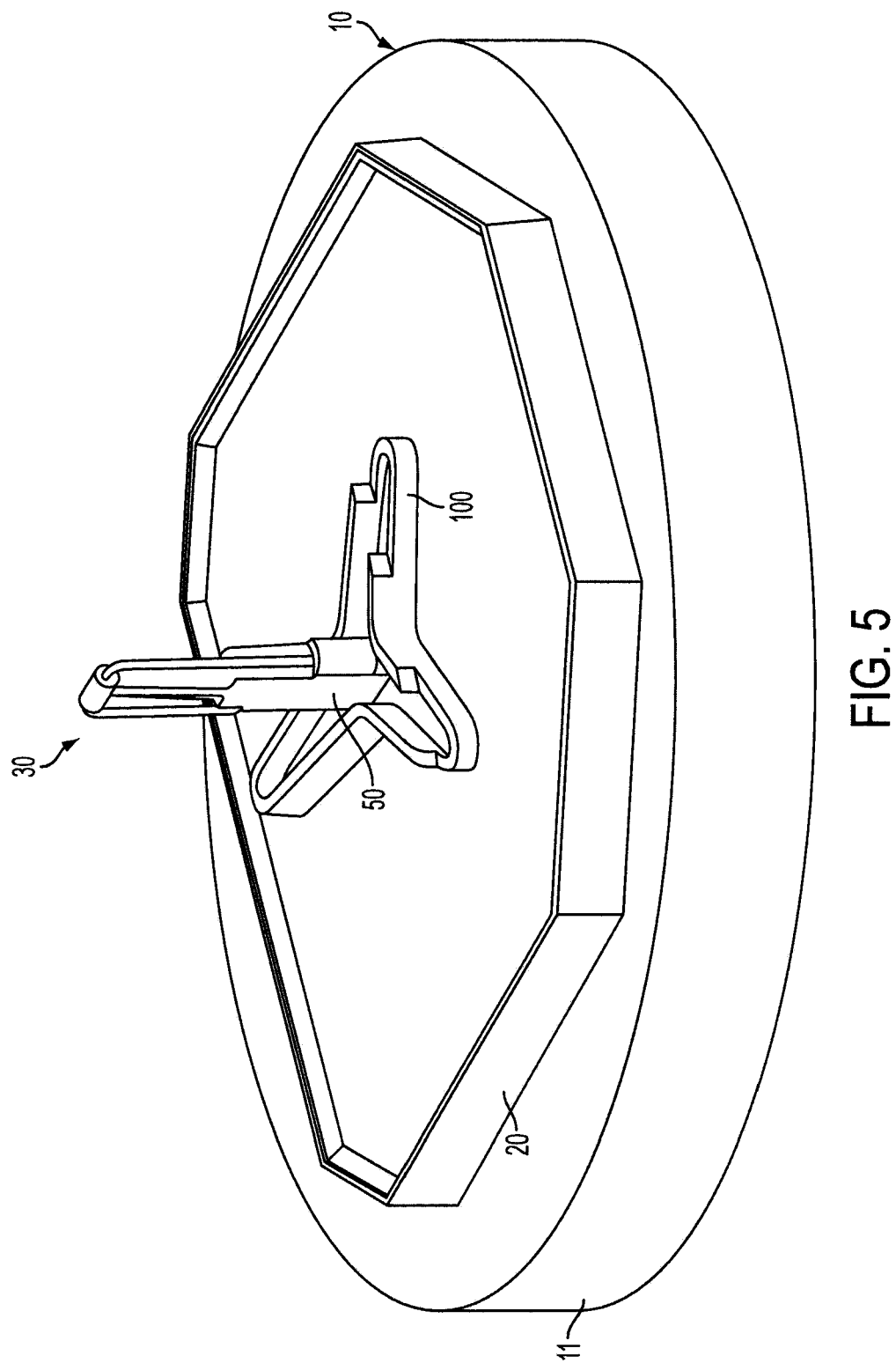
FIG. 5 is a perspective view of an interior of the detector assembly of FIG. 1 in accordance with alternative embodiments.

With reference to FIG. 5, the temperature response element 30 may be supported proximate to a center of the board 20. In this case, the support 40 may includes a tripod-like structure 100 at the first end 51 of the elongate member 50. In this way, support for the temperature response element 30 can be provided by way of the saddle 70 and the legs of the tripod-like structure 100 that extend from the elongate member 50 in multiple transverse directions. In accordance with the embodiment of FIG. 5, the centrally located temperature response element 30 can be provided with or without an additional detector assembly component 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A detector assembly, comprising:
   a board;
   a temperature response element; and
   a support coupled to the board to support the temperature response element, the support including:
      an elongate member having first and second opposing ends and being coupled to the board at the first end,
      guides through which temperature response element leads are threadable, and
      a saddle disposed at the elongate member second end to inhibit displacement of the temperature response element.

2. The detector assembly according to claim 1, further comprising a detector assembly component removably attachable to the board.

3. The detector assembly according to claim 2, wherein the detector assembly component comprises at least one or more of a smoke chamber, a power coupling and a control element.

4. The detector assembly according to claim 2, wherein an orientation of the temperature response element and the support is variable relative to that of the detector assembly component.

5. The detector assembly according to claim 2, wherein the temperature response element is plural in number and arrayed around the detector assembly component.

6. The detector assembly according to claim 5, wherein three temperature response elements are arrayed around the detector assembly component.

7. The detector assembly according to claim 2, wherein the detector assembly component comprises a housing having a contoured sidewall and the support comprises a lateral member extending along the board and having a contoured surface complementing the contoured sidewall.

8. The detector assembly according to claim 1, wherein the temperature response element comprises at least one or more of a diode, a resistive element, and thermocouple and a thermo-electric element.

9. The detector assembly according to claim 1, wherein the saddle and the temperature response element include contactable parts with complementary shapes.

10. The detector assembly according to claim 1, wherein the temperature response element includes a substantially cylindrical part.

11. The detector assembly according to claim 10, wherein the saddle includes a distal end surface formed to define a groove to inhibit movement of the substantially cylindrical part in a radial dimension thereof.

12. The detector assembly according to claim 1, wherein the temperature response element has a substantially spherical part.

13. The detector assembly according to claim 1, wherein a length of the guides is less than a length of the elongate member.

14. The detector assembly according to claim 1, further comprising:
   a base to which the board is connectable; and
   a cover plate, which is removably attachable to the base.

15. The detector assembly according to claim 1, wherein the temperature response element is supported proximate to a center of the board.

16. The detector assembly according to claim 1, wherein the support comprises a tripod-like structure at the first end of the elongate member.

17. A detector assembly, comprising:
   a planar board;
   a thermistor, including a substantially cylindrical part, to measure an ambient temperature; and
   a support coupled to the board to support the thermistor, the support including:
      an elongate member having first and second opposing ends and being coupled to the board at the first end,
   guides through which thermistor leads are threadable, and
   a saddle disposed at the elongate member second end and including a distal end surface formed to define a groove to inhibit movement of the substantially cylindrical part in a radial dimension thereof.

18. A detector assembly, comprising:
   a planar board to which a detector assembly component is removably attachable;
   a plurality of thermistors, each including a substantially cylindrical part, to measure an ambient temperature; and
   a plurality of supports coupled to the board to respectively support each of the thermistors, the supports each including:
   an elongate member having first and second opposing ends and being coupled to the board at the first end,
   guides through which thermistor leads are threadable, and
   a saddle disposed at the elongate member second end and including a distal end surface formed to define a groove to inhibit movement of the corresponding substantially cylindrical part in a radial dimension thereof.

* * * * *